US006845697B2

(12) United States Patent
Kovacs

(10) Patent No.: US 6,845,697 B2
(45) Date of Patent: Jan. 25, 2005

(54) SLICER CARRIAGE TRACKING ARRANGEMENT

(75) Inventor: Mark Kovacs, Kettering, OH (US)

(73) Assignee: Premark FEG L.L.C., Wilmington, DE (US)

(*) Notice: Subject to any disclaimer, the term of this patent is extended or adjusted under 35 U.S.C. 154(b) by 268 days.

(21) Appl. No.: 10/014,926

(22) Filed: Oct. 26, 2001

(65) Prior Publication Data

US 2003/0079589 A1 May 1, 2003

(51) Int. Cl.[7] .............................. B26D 5/00; B27B 5/02; B27B 5/18; B23D 45/00

(52) U.S. Cl. ............................... 83/62; 83/707; 83/714; 83/730; 83/932

(58) Field of Search ................................ 83/74, 75, 62, 83/707–731, 932

(56) References Cited

U.S. PATENT DOCUMENTS

| | | | | |
|---|---|---|---|---|
| 3,051,207 A | | 8/1962 | Hartley | |
| 3,319,681 A | | 5/1967 | Anecki | |
| 3,320,990 A | | 5/1967 | Anecki | |
| 3,442,312 A | | 5/1969 | Karp | |
| 3,452,833 A | | 7/1969 | Wolters | |
| 3,613,754 A | | 10/1971 | Hartley | |
| 3,672,420 A | | 6/1972 | Hartley et al. | |
| 3,704,736 A | | 12/1972 | Pratley | |
| 3,857,310 A | | 12/1974 | Tiby | |
| 3,938,602 A | | 2/1976 | Sly et al. | |
| 3,958,478 A | | 5/1976 | Camper | |
| 3,986,304 A | | 10/1976 | Shie, III | |
| 4,015,494 A | | 4/1977 | Spooner et al. | |
| 4,227,656 A | | 10/1980 | Engebretsen | |
| 4,266,456 A | | 5/1981 | Oostvogels | |
| D259,883 S | | 7/1981 | Engebretsen | |
| 4,434,694 A | | 3/1984 | Scharsig | |
| 4,499,804 A | | 2/1985 | Takeda | |
| 4,532,840 A | | 8/1985 | Antonissen | |
| 4,541,319 A | | 9/1985 | Maurer et al. | |
| 4,546,685 A | | 10/1985 | Maurer et al. | |
| 4,793,228 A | | 12/1988 | Etter et al. | |
| 4,813,316 A | | 3/1989 | Johnson et al. | |
| 5,101,704 A | | 4/1992 | Jones et al. | |
| 5,241,885 A | | 9/1993 | Kuchler | |
| 5,461,957 A | | 10/1995 | Koch et al. | |
| 5,509,337 A | | 4/1996 | Norman et al. | |
| 5,666,866 A | | 9/1997 | Huang et al. | |
| 5,787,776 A | | 8/1998 | Nishimoto | |
| 5,974,925 A | * | 11/1999 | Lindee et al. | 83/932 |
| 6,092,448 A | | 7/2000 | Cartwright et al. | |
| 6,267,033 B1 | * | 7/2001 | Gundlach et al. | 83/932 |
| 2002/0050198 A1 | * | 5/2002 | Kuchler | 83/717 |

FOREIGN PATENT DOCUMENTS

| | | |
|---|---|---|
| WO | 98/55277 | 12/1998 |

* cited by examiner

*Primary Examiner*—Allan N. Shoap
*Assistant Examiner*—Jason Prone
(74) *Attorney, Agent, or Firm*—Thompson Hine LLP

(57) ABSTRACT

A system and method for tracking and controlling the food product carriage of a food product slicer is described.

29 Claims, 10 Drawing Sheets

SLICER CARRIAGE TRACKING ARRANGEMENT

TECHNICAL FIELD

The present invention relates generally to food product slicers and, more particularly, to an arrangement and method for tracking and controlling movement of a food product carriage of a food product slicer.

BACKGROUND

Food product slicers generally include a food product carriage which is mounted on a slide rod within the slicer housing to allow the carriage to be moved back and forth past a rotating slicing knife. Manual, automatic and combination slicers are known. In the case of automatic or combination slicers a variety of drive arrangements for the food product carriage are also known. In some slicers a multi-link drive arrangement is provided between a rotating motor output and the food product carriage, where the motor rotates in a single direction and change in direction of the food product carriage is achieved mechanically via interaction of the links making up the multi-link drive arrangement.

It would be desirable to provide a simple, inexpensive system and method for providing increased control capabilities in connection with such multi-link drive arrangements.

SUMMARY

In one aspect, a control system for a food product slicer including a rotatable slicing knife and a food product carriage mounted for movement back and forth past the slicing knife is provided. The control system includes a motor having a rotating output. A multi-link drive arrangement is connected between the rotating output of the motor and the food product carriage for moving the carriage during motor operation, a pivot link of the multi-link drive arrangement having a stationary axis, the pivot link pivoting back and forth about the stationary axis during motor operation. An encoder arrangement is associated with the pivot link and includes a curved mask element, a light source and a photo-detector. The curved mask element includes a plurality window regions distributed thereon. The light source is positioned for directing light at the window regions of the curved mask element sequentially during pivoting movement of the pivot link and the photo-detector is positioned to receive light directed at the window regions by the light source. The photo-detector provides output signals responsive to receipt/non-receipt of light emitted by the light source. A controller receives the photo-detector output signals and responsively tracks movement of the food product carriage.

In another aspect, a method for automatically controlling a food product slicing operation in which a food product carriage is repeatedly moved back and forth past a slicing knife is provided where the slicing operation is defined by repeated slicing strokes and return strokes of the food product carriage, each slicing stroke defined by movement of the food product carriage from a first position to a second position and each return stroke defined by movement of the food product carriage from the second position back to the first position. The method involves utilizing a motor and associated multi-link drive arrangement to effect movement of the food product carriage; providing an encoder arrangement having at least one element connected for pivoting movement with a pivot link of the multi-link drive arrangement to produce output signals indicative of a pivoting movement of the pivot link about a stationary axis; and based at least in part upon the output signals of the encoder arrangement, automatically controlling motor rotation so as to automatically move the food product carriage at a first average speed for slicing strokes and to automatically move the food product carriage at a second average speed for return strokes, the first average speed being slower than the second average speed.

In still another aspect, a method of operating a slicer including a reciprocating carriage involves the steps of providing a single switch for starting an automatic slicing operation and pausing the automatic slicing operation; responsive to triggering of the switch prior to slicing, initiating the automatic slicing operation; and responsive to triggering of the switch during slicing, pausing the automatic slicing operation.

DETAILED DESCRIPTION

Figure 1:
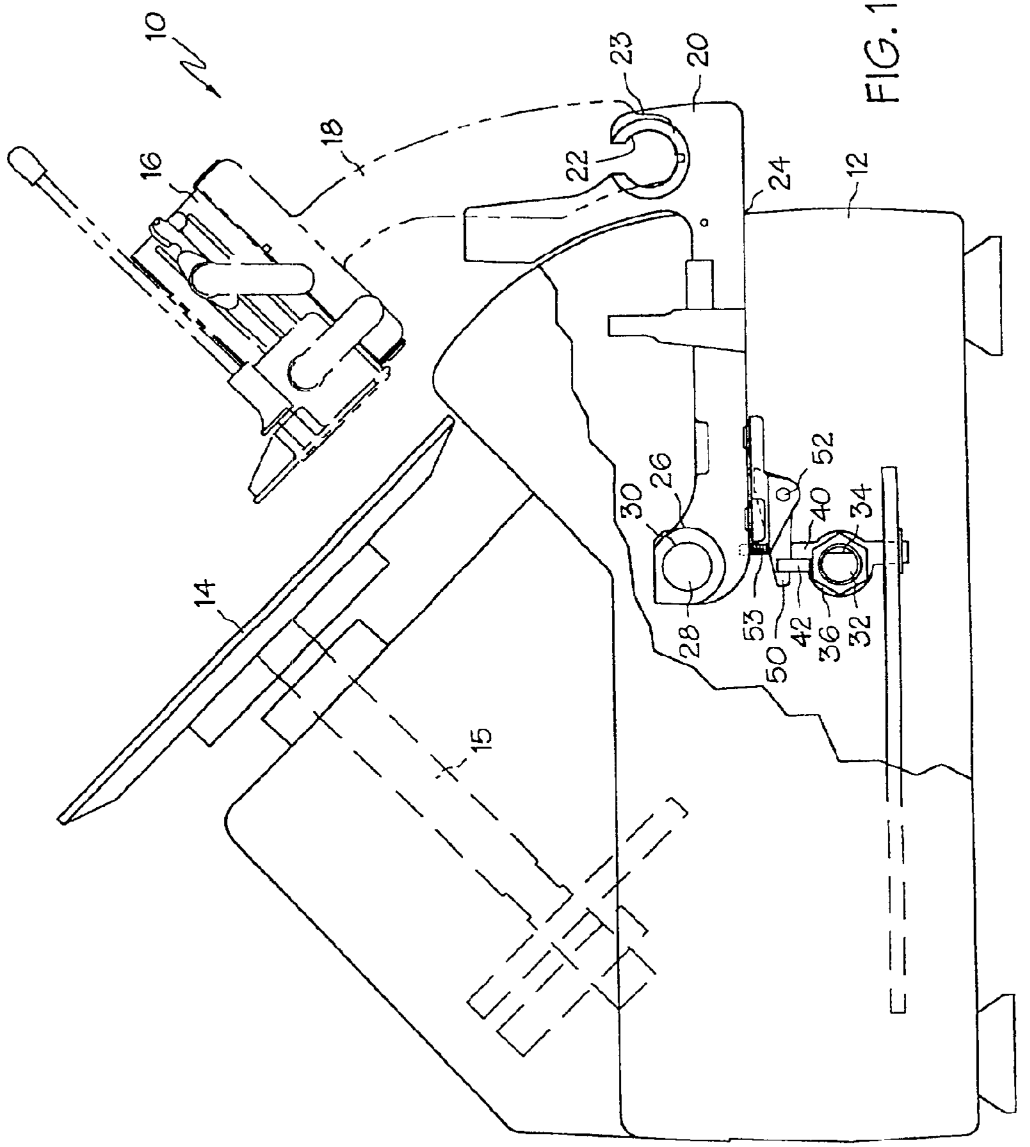
FIG. 1 is a partial end elevation of a food product slicer.
Figure 2:
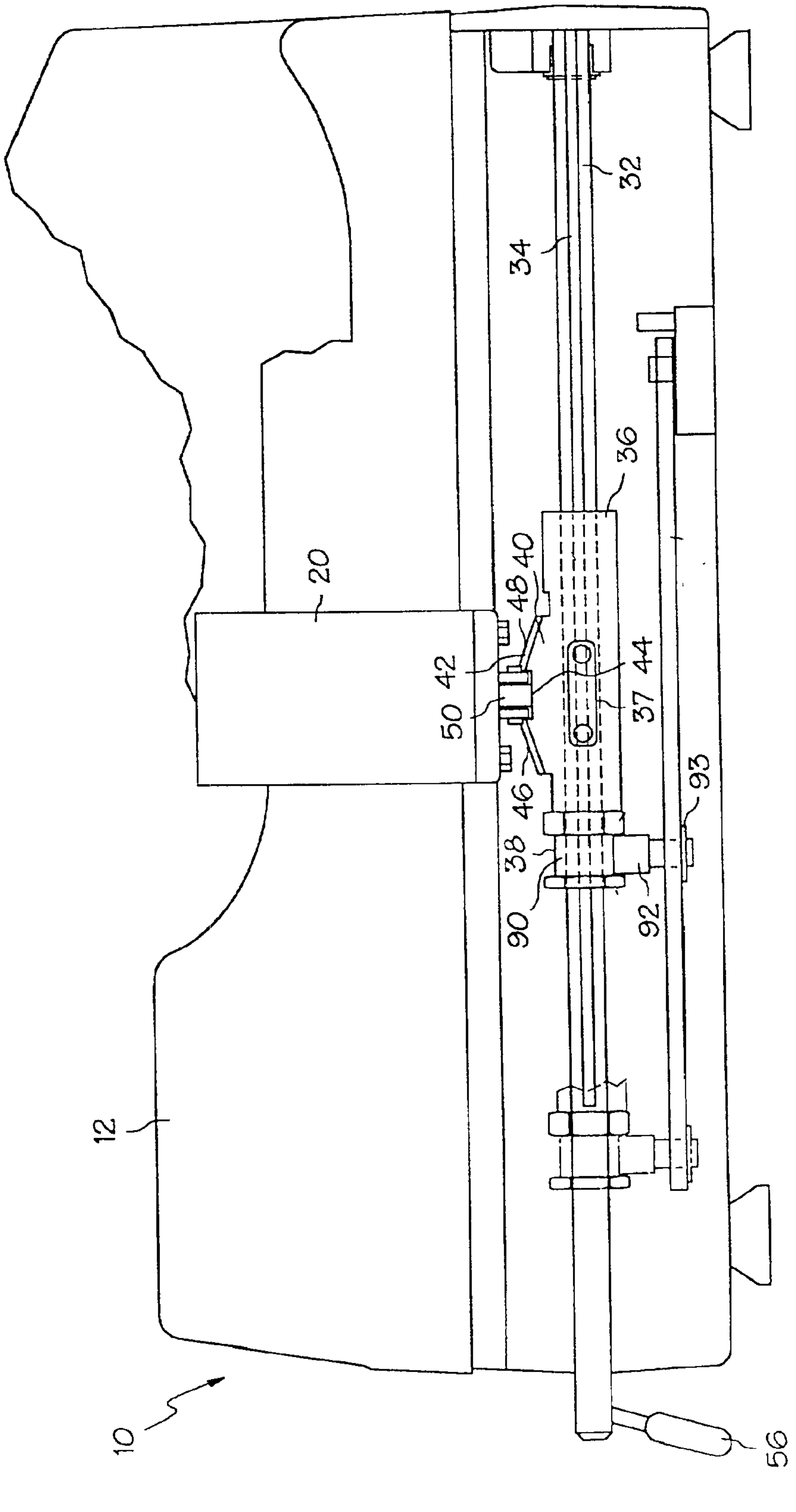
FIG. 2 is a partial side elevation of the slicer of FIG. 1.

As shown in FIGS. 1 and 2, a food product slicer generally designated 10 in includes a housing 12 and a circular, motor-driven slicing knife 14 which is rotatably mounted to the housing on a fixed axis shaft 15. The food product is supported on a carriage 16 which moves the food product to be sliced past the rotating slicing knife 14. The carriage reciprocates in a linear path in a direction generally parallel to the plane of the blade, and can be powered either automatically or manually.

The carriage 16 is mounted on a carriage arm 18 which orients the carriage at the appropriate angle (typically perpendicular) to the slicing knife 14. The carriage arm 18 is supported on a transport 20. The transport has a mounting slot 22 to receive the foot 23 of the carriage arm 18. Transport 20 reciprocates in a slot 24 within the housing 12. The transport 20 has a through hole 26 on the end opposite the carriage arm mounting slot 22. The through hole 26 attaches the transport 20 to a transverse bar or slide rod 28 and associated bearings 30 maybe provided to facilitate reciprocal movement of the transport 20 along the transverse bar 28.

The food slicer 10 also includes a slide rod 32 mounted on either end to the housing 12. The slide rod 32 extends almost the entire length or width of the slicer, parallel to the transverse bar 28. The slide rod 32 is stationary and is preferably substantially cylindrical having a generally circular cross-section with a flat side 34. As shown in FIG. 2, a carrier 36 is mounted for reciprocal movement along the slide rod 32. The carrier 36 may be adapted to include a plate 37 which is mounted to the front of the carrier and fits to the flat portion 34 of the slide rod so that the carrier does not rotate during its traversal of the rod. The carrier 36 has a raised central portion 40 to which a ramp 42 is attached on the upper end thereof. The ramp 42 may be fastened to the carrier or it may be formed unitary with the carrier. The ramp 42 includes a cutout notch 44 therein and both sides 46, 48 of the ramp are inclined upwardly toward the cutout 44.

As shown in FIG. 1, the transport 20 includes a coupling member such as pawl 50 at the lower end thereof. The pawl 50 is mounted to the transport by a pin 52. The pawl 50 is spring-actuated by means of a spring 53 which is housed in the transport and reacts against the pawl 50. The pawl 50 is shaped to fit within the notch 44 in the ramp portion 42 of the carrier 36. When the transport 20 is moved toward the carrier 36, the pawl 50 will ride up the ramp 46 or 48 and click into place in the notch 44, by means of the spring 53 so that the linear movement of the carriage 16 is thereafter dependent upon the movement of the carrier 36.

Figure 3:
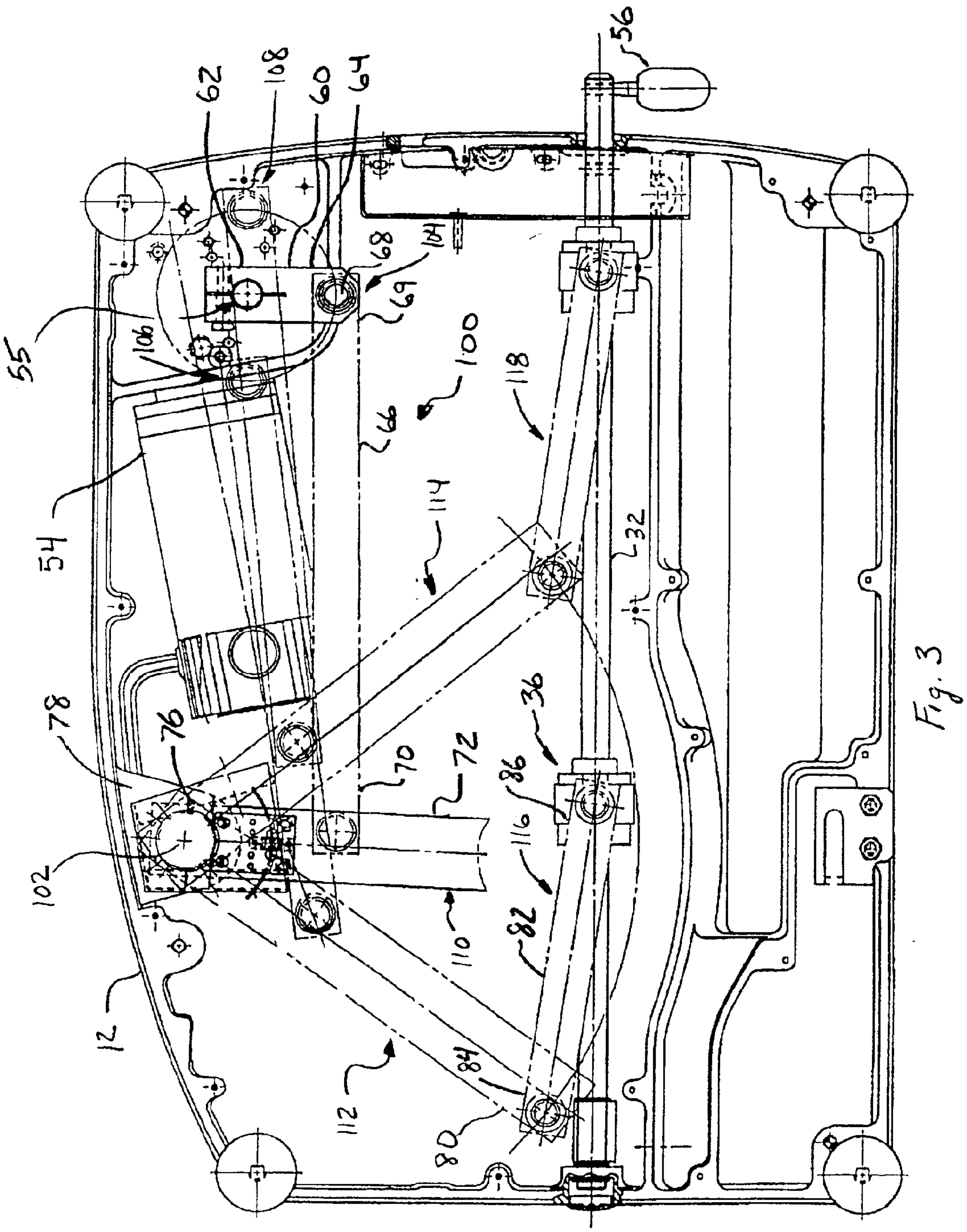
FIG. 3 is a bottom view of the slicer of FIG. 1.

The carrier 36 is operatively connected for movement by a motor 54 through a multi-link drive arrangement 100 having a series of links or linkages. After the pawl 50 is locked in place, the food product carriage 16 is thereby operatively coupled to the motor 54 for automatic operation (i.e., the carriage is driven by the motor through the multi-link drive arrangement). The motor 54 drives the carrier by means of the linkages as shown in FIG. 3. The carrier 36 moves the transport 20 and the transport moves the carriage 16. In contrast, when the pawl 50 is not engaged in the cutout 44, the carriage can be moved manually.

To disengage the pawl for manual operation, a lever 56 shown in FIG. 2 is used. The lever 56 is coupled to slide rod 32 such that rotation of the lever 56, causes the slide rod to rotate. As the slide rod 32 rotates, the carrier 36 rotates along with the slide rod due to the fact that the two cannot rotate relative to each other. After the carrier 36 rotates, the ramp 42 no longer faces upwards toward the transport 20, but is instead rotated to the side and the carrier 36 is disengaged from the pawl 50. When the carrier 36 is in this position, the transport 20 may be freely moved manually back and forth, and the pawl 50 does not contact the cutout 44 in the ramp 42. The carriage 16 of the slicer can thus be operated manually without interference from the drive mechanism. When the operator desires to return to automatic motion, the lever 56 is turned so that the slide rod 32 rotates the carrier 36 to its upright position. Then, the operator may manually reciprocate the carriage until the pawl 50 on the transport 20 rides up the ramp 42 and is fixed to the carrier 36 via engaging the cutout 44.

The carrier 36 may also include an adjustable member 38 that, due to its attachment to the linkage, establishes the point for the carrier to stop and change directions. The adjustable member 38 is attached to the carrier and reciprocates along with the carrier on the slide rod 32. The adjustable member 38 may have a ring-shaped upper portion 90 through which the slide rod 32 passes. The bottom stick portion 92 extends downward toward the ground. The lowermost portion has a retaining ring 93 which connects the adjustable member 38 to a link 82 of the multi-link drive arrangement. The adjustable member 38 does not rotate with the carrier 36 or the slide rod 32 but instead stays in an upright position since it is fixed to the linkages below. Further details of this assembly are described in international patent application No. PCT/US98/09120 published under international publication No. WO 98/55277.

The multi-link drive arrangement 100 is now described in detail with reference to the bottom view of FIG. 3 where a drive motor 54 having a rotating output 55 is shown. In the illustrated embodiment the motor 54 may be formed by a permanent magnet DC, right-angle gear motor, but it is recognized that other motor types could be used. The illustrated multi-link drive arrangement 100 uses a set of four links or linkages connected to the output 55 of the motor 54 on one end and to the adjustable member 38 of the carrier 36 on the other. The right-angle gear motor 54 is oriented so that the output shaft 55 extends vertically downward toward the ground and perpendicular to the slide rod 32. A first linkage 60 is attached on its first end 62 to the rotating output shaft 55 of the motor 54 for movement therewith and is pivotally attached on its other end 64 to an end 69 of a second linkage 66. A stud or pin 68 may connect the first linkage 60 to the second linkage 66 to provide a pivotal connection between the two linkages. The second linkage 66 is pivotally connected on its second end 70 to a third linkage 72 at a location along the length of the third linkage by means of another stud 74. The third linkage 72 is pivotally connected on one end 76 to a flange 78 on the housing 12 to establish a fixed pivot point or axis 102 relative to the housing 12, and is pivotally connected on its other end 80 to a fourth linkage 82 at its end 84. The fourth linkage 82 is pivotally connected at its other end 86 to the carrier 36.

Operation of the multi-link drive arrangement 100 is now described with reference to FIG. 3 and with the understanding that three, representative positions of the arrangement are shown in FIG. 3. Linkage 60 is connected at its end 62 for rotation with the rotating motor output 55 and therefore linkage 60 continuously rotates through 360 degrees during motor operation. Three representative positions 104, 106, 108 of the end 64 of linkage 60 are shown. Rotation of linkage 60 effects movement of linkage 66 and positions 104, 106, 108 also depict three representative positions of the end 69 of linkage 66 during such movement. Movement of linkage 66 effects pivoting movement of linkage 72 back and forth about fixed pivot axis 102 and three representative pivot positions 110, 112, 114 of linkage 72 are shown, with positions 112 and 114 showing the two extreme pivot positions in either direction. The two illustrated positions 116, 118 of linkage 82 correspond respectively to pivot extremes 112 and 114 of linkage 72. During a slicing operation, movement of the food product carriage 16 back and forth past the slicer knife 14 is effected via rotation of the motor output 55, which in turn effects movement of the linkages 60, 66, 72, 82, which in turn effects movement of the carrier 36 along slide rod 32, which in turn effects movement of the transport 20 along bar 28, which in turn effects movement of the carriage arm 18 and thus the food product carriage 16.

Figure 6:
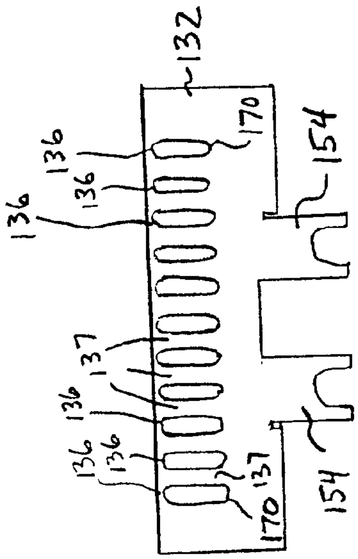
FIG. 6 shows one embodiment of a mask element.

It is recognized that the foregoing description represents one of many possible embodiments both for a multi-link drive arrangement itself, and for connecting such an arrangement between a rotating motor output and a food product carriage. Exemplary of other constructions utilizing multi-link drive arrangements include those described in U.S. Pat. Nos. 3,051,207 and 5,461,957. One commonality between such arrangements is that each arrangement includes a primary link or pivot link that, during slicing, pivots back and forth about a pivot axis which is fixed relative to the slicer housing, similar to the linkage 72 noted above. An encoder arrangement useful in connection with such multi-link drive arrangements is now described with particular reference to FIGS. 4–6.

Figure 4:
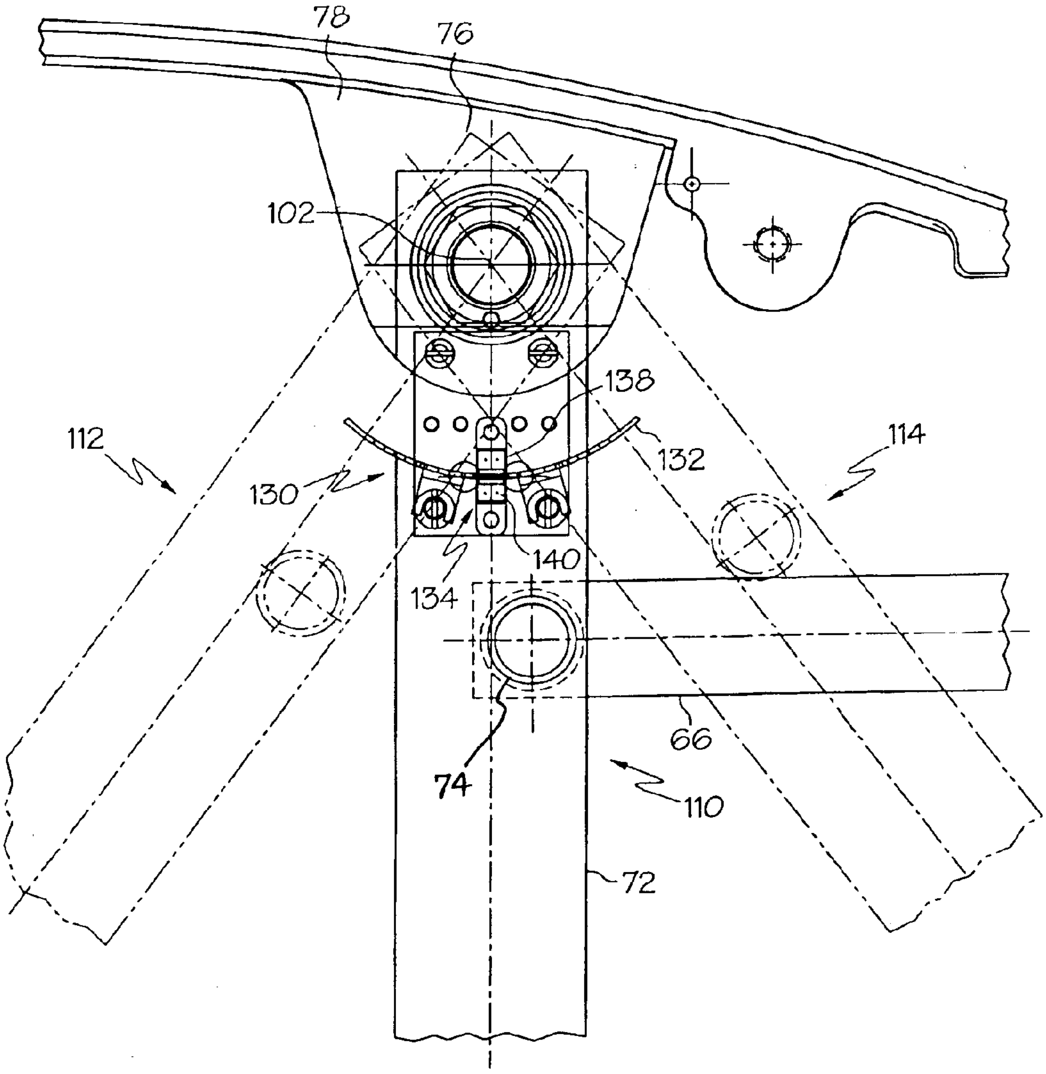
FIG. 4 is an enlarged view of a portion of FIG. 3.
Figure 5:
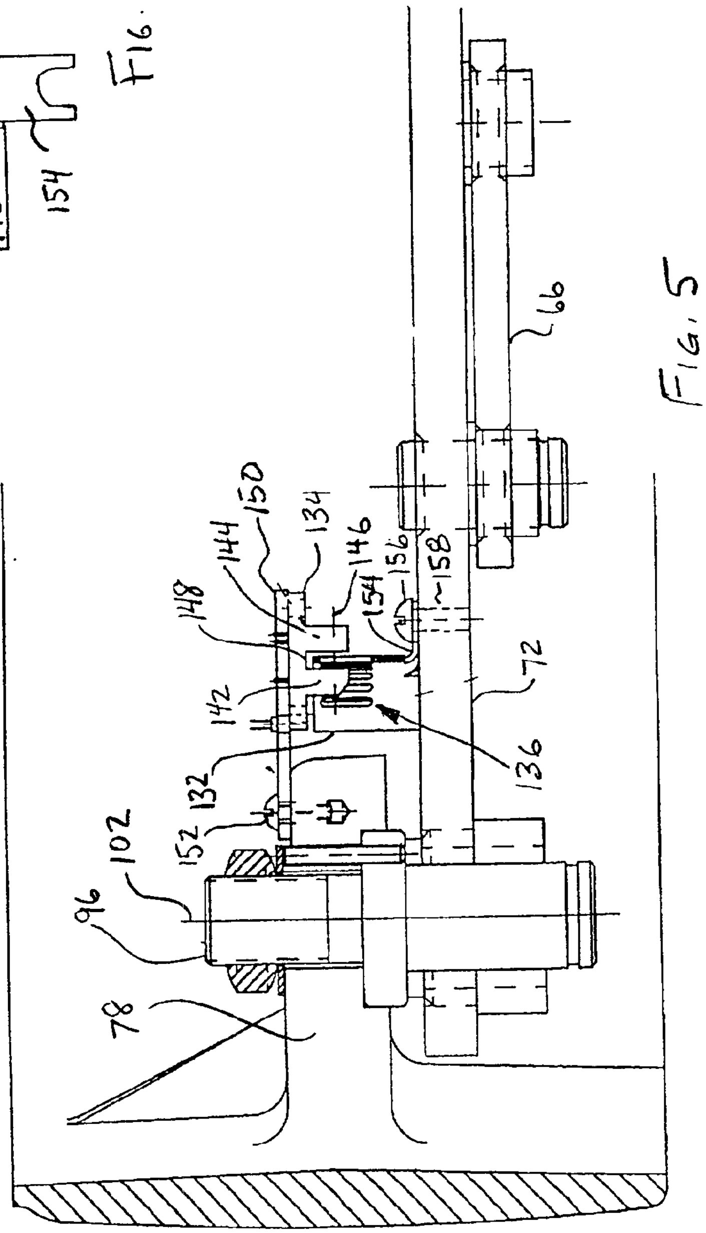
FIG. 5 is a side elevation of FIG. 4.

FIG. 4 shows an enlarged, partial view about the end 76 of linkage 72 of FIG. 3. The three positions 110, 112, 114 of linkage 72 are depicted. An encoder arrangement 130 is shown and includes an arcuate vain or mask element 132 and an opto-switch 134. The mask element 132 includes a plurality windows 136 (FIG. 5) distributed thereon. While the mask element 132 has a curved arcuate shape, a representative view of the mask element 132 when flattened is provided in FIG. 6 to facilitate illustration of the windows 136. The illustrated windows 136 are evenly spaced along the length of the mask element 132 and are of similar size and shape. Although eleven window regions are shown, the number of window regions could vary.

The opto-switch 134 is formed by a light source 138 and a photo-detector 140 arranged as a pair. In the illustrated embodiment the opto-switch 134 is formed as a unitary, molded plastic member with spaced apart portions 142 and 144 respectively holding the light source 138 and photo-detector 140 such that light from the light source is directed along an axis 146 toward the photo-detector 140. The spaced apart portions 142, 144 also define a slot 148 for receiving the windowed portion of the mask element 132 therein so that the light source 138 is positioned to one side of the mask element 132 and the photo-detector 140 is positioned on an opposite side of the mask element 132. The opto-switch 134 is connected to a PC board 150 that provides the necessary electrical connections for the light source 138 and photo-detector 140. The PC board is in turn fixedly connected to the slicer housing flange via a screw 152 or other suitable means. It is recognized that the light source 138 and photo-detector need not be formed as part of a unitary member and the use of a PC board is not required.

The mask element 132 may be formed of a punched metal plate material that is then bent into an arcuate shape. The mask element 132 is connected for pivoting movement with the linkage 72 via a bent, flange portion 154 of the mask element 132 through which a screw 156 passes and is received in a correspondingly threaded hole 158 in the linkage 72. It is recognized that the mask element 132 could be formed of other materials and it is also recognized that other attachment schemes could be used to connect, either directly or indirectly, the mask element 132 to the linkage 72 for movement therewith. The arcuate mask element 132 is positioned such that its axis is substantially aligned with the pivot axis 102 of the linkage 72. A pin 96 connecting linkage 72 to flange 78 is also shown.

Figure 7:
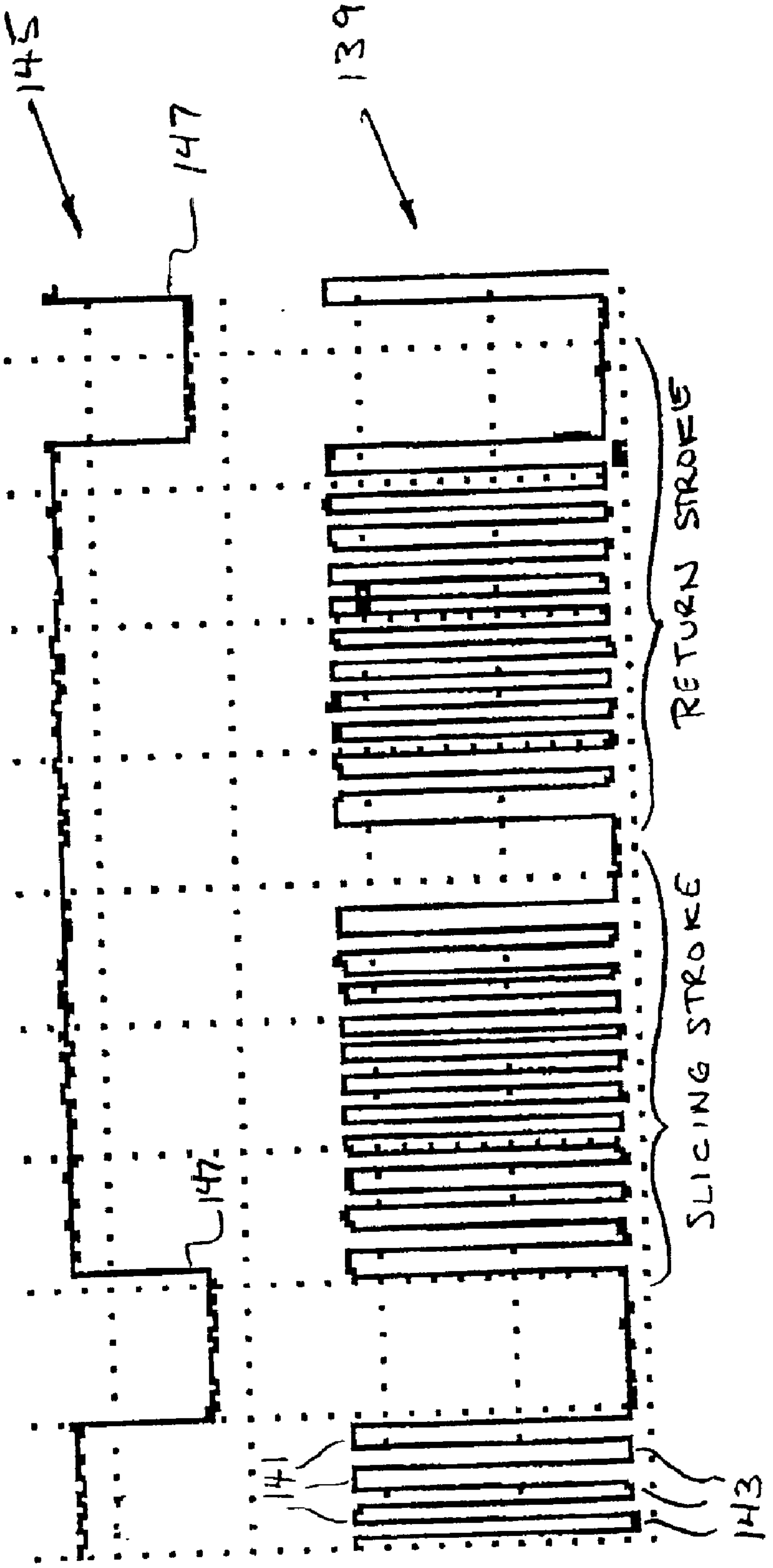
FIG. 7 illustrates one embodiment of output pulses of the encoder arrangement.

In the illustrated encoder arrangement, the arcuate mask element 132 pivots back and forth with the linkage 72 and the opto-switch 134 remains in a fixed position. Movement of the mask element 132 correspondingly causes the windows 136 on the mask element 132 to be sequentially and repeatedly moved past the opto-switch 134 to repeatedly make and break the optical link between the light source 138 and the photo-detector 140. The photo-detector 140 responsively produces output signals indicative of receipt/non-receipt of light from the light source. By way of example, the photo-detector 140 output 139 may be a series of voltage pulses as shown in FIG. 7. Each high voltage region/pulse 141 of the signal 139 may represent alignment of the opto-switch 134 with a window 136 of the mask element 132 and each low voltage region 143 of the signal may represent alignment of the opto-switch 134 with a light blocking portion 137 of the mask element 132 located between each window 136. Alternatively, each high voltage region/pulse 141 of the signal 139 could represent alignment of the opto-switch 134 with a light blocking portion 137 of the mask element 132 and each low voltage region 143 of the signal could represent alignment of the opto-switch 134 with a window 136 of the mask element 132. Also shown is a corresponding home position sensor signal 145 which is normally high and pulses to a lower voltage at 147 to indicate the home position (in this case the position nearest the operator).

Figure 8:
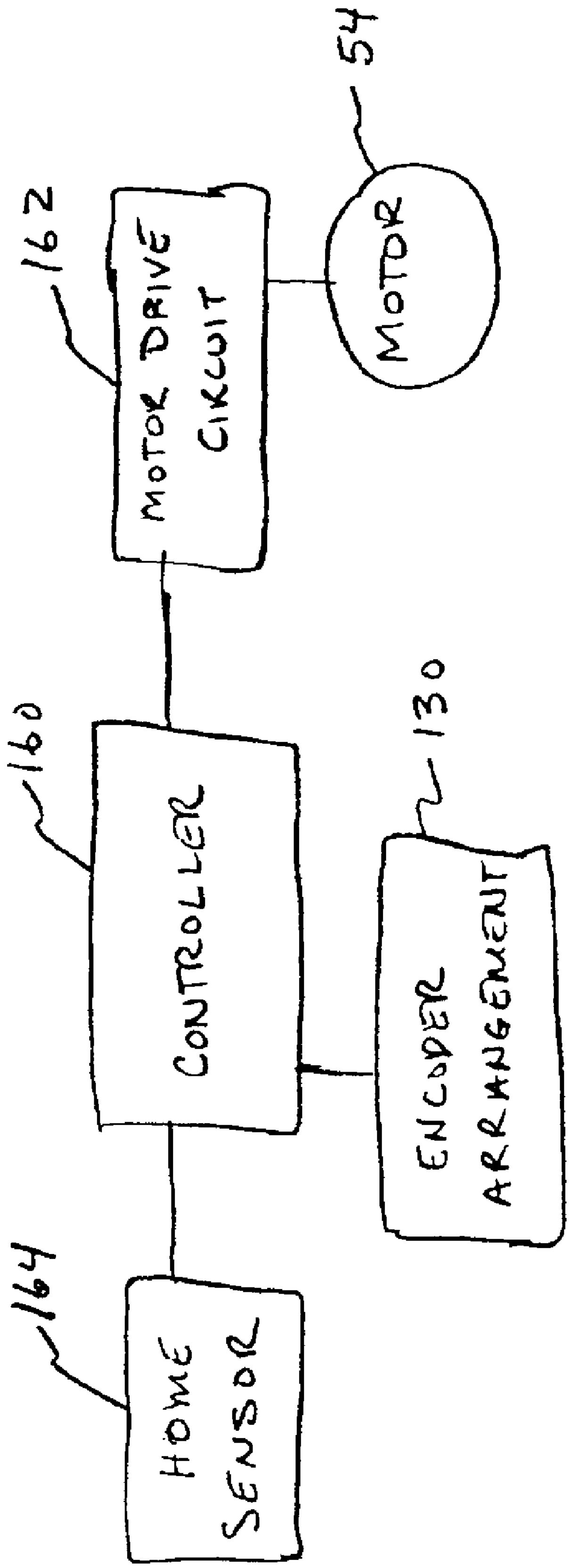
FIG. 8 illustrates a schematic of the control system.

Referring now to FIG. 8, a schematic illustrating the electronics of the control system are shown including the encoder arrangement 130 being connected to a controller 160 for providing the photo-detector output signals thereto. The controller 160 may be formed by a programmed microprocessor or microcontroller and associated input/output circuitry. The controller 160 is operable to interpret the photo-detector output signals and responsively control the rotation of the motor 54 via signals delivered to a motor drive circuit 162. In particular, and relative to the illustrated embodiment, the controller 160 may count the pulse signals produced by the encoder arrangement 130 to track the movement of the linkage 72 and thus correspondingly track the position of the food product carriage 16. A home position sensor 164 may be located to provide a signal indicative of when the food product carriage reaches a predetermined home position. In one embodiment, the home position may be defined as the position when the food product carriage is in front of the slicing knife and nearest the operator (to the far left in FIG. 2). In another embodiment the home position may be defined as the position when the food product carriage is past the slicing knife and furthest from the operator (to the far right in FIG. 2). As an alternative to the separate home position sensor 164, the encoder arrangement could be configured to provide an output signal indicative of the defined home position. For example, one of the end windows 170 of the mask element 132 could be positioned for alignment with the opto-switch 134 when the food product carriage is at the defined home position in which case the signal produced by the photo-detector 140 could have a characteristic indicating the home position. For example, the signal characteristic could be a longer duration of the output pulse resulting from the change in pivot direction of the linkage 72, or the end window 170 could shaped and sized differently than the other windows to produce a voltage output pulse of a different magnitude by allowing more or less light to reach the photo-detector 140.

An exemplary discussion of controller 160 processing during a slicing operation might be as follows for an assumed case of a home position nearest the operator, a system using a separate home position sensor 164 and an encoder arrangement 130 using a mask element 132 including eleven window regions 136. When the food product carriage reaches the home position the home position sensor outputs a signal to the controller 160 and the controller "resets" its carriage tracking operation. The controller 160 then outputs appropriate motor control signals to the motor drive circuit 162 to produce a desired motor rotating speed for a slicing stroke. The controller 160 is configured to count both high voltage pulses 141 output from the encoder arrangement 130 and low voltage regions 143 so that for a given slicing stroke the total count will reach twenty-two and on the return stroke the count will reach 44. The controller begins its counting operation for the initiated slicing stroke until the count reaches a threshold number indicative of the food product carriage 16 approaching the end of the slicing stroke at which time the controller 160 delivers output signals to the motor drive circuit 162 to slow rotation of the motor output 55 prior to the food product carriage 16 reaching the end of the slicing stroke. In this example the threshold number could be in the range of 16–21, although different counts could be used. After the controller counts reaches an end of slicing stroke indicative number, in this case twenty-two, the controller 160 delivers output signals to the motor drive circuit 162 to produce a desired motor rotating speed for a return stroke. When the controller count reaches a threshold number indicative of the food product carriage approaching the end of the return stroke, the controller 160 may again deliver output signals to the motor drive circuit 162 to slow rotation of the motor output 55. When the home position is sensed by sensor 164, the controller 160 resets its carriage tracking operation and begins counting pulses anew.

In the preferred embodiment the controller 160 effects control of motor rotation such that an average speed of slicing strokes is less than an average speed of return strokes. This type of controlled operation can facilitate an overall increase in the speed of the slicing operation as compared to a slicing operation in which the average speed of both slicing strokes and return strokes is the same, given some of the limits placed on the speed at which the slicing stroke can take place and still acceptably slice the food product. In the above exemplary operation, slowing down the speed of motor rotation near the end of the slicing stroke and/or near the end of the return stroke can effect a reduction in shift of the food product on the food product carriage 16 upon change in direction of the food product carriage 16. It is also recognized that the controller 160 may produce output signals which effect controlled acceleration of the motor at the beginning of each slicing stroke and at the beginning of each return stroke.

The slicer may be also equipped with two features called "home start" and "home return." The "home start" feature insures that when in automatic mode, the motor will not start until the carrier 36 (and thus the carriage) is in the home position. In one embodiment, the home position may be defined as the position in front of the slicing knife and nearest the operator (to the far left in FIG. 2). Therefore, if the food product carriage 16 stops and it is not returned to the home position, it needs to be manually pulled back to that position before automatic operation can begin again. The "home return" feature causes the carriage to automatically return to the "home" or start position upon completion of an automatic slicing operation.

Figure 9:
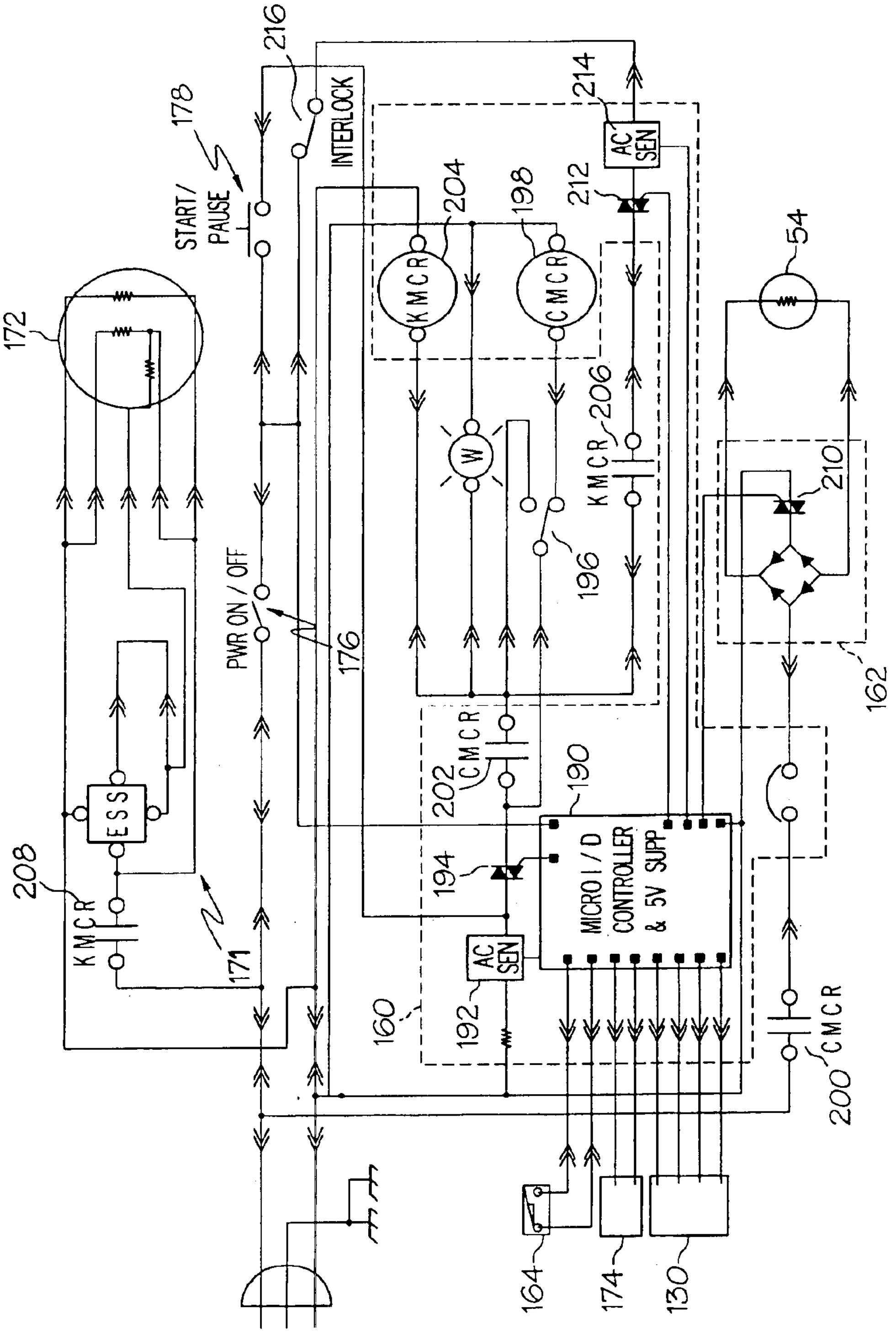
FIG. 9 is a schematic of one embodiment of a slicer control system.
Figure 10:
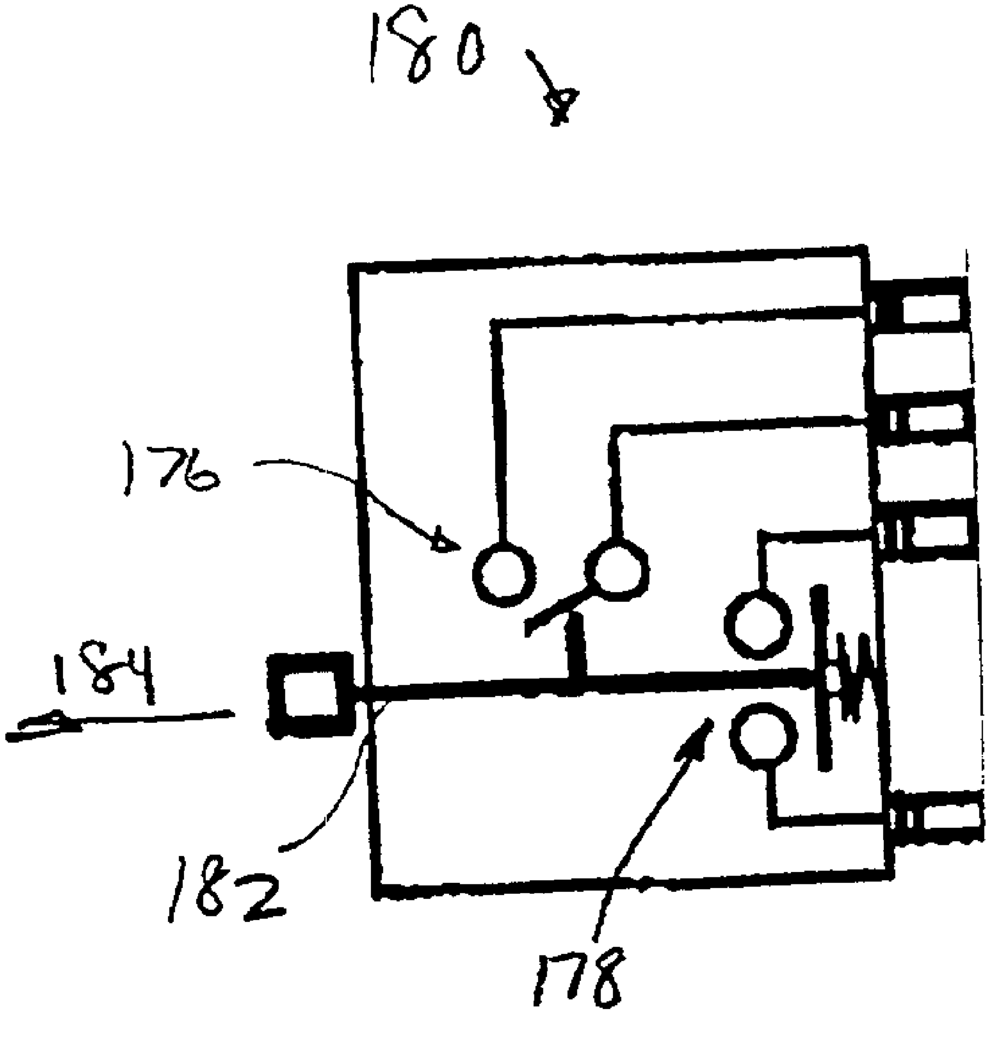
FIG. 10 illustrates one embodiment of a switch assembly.

In this regard, while "home return" and "home start" features are not considered new per se, a novel control circuit arrangement that advantages facilitates such features is now described with reference to FIG. 9. The controller 160, home position sensor 164, encoder arrangement 130, motor 54 and motor drive circuit 130 are shown. Also shown are a knife motor drive 171, knife motor 172, carriage speed control input/dial 174, a power on/off switch 176 and a combination start/pause switch 178. In one embodiment the switch 176 and 178 may be combined in a single switch assembly 180 as shown in FIG. 10 where a single actuator 182 is pulled (left arrow 184) to first close switch 176. The actuator 182 remains in a partially extended position when pulled to maintain switch 176 closed. The actuator can be further pulled to temporarily close switch 178, with the actuator 182 being spring biased to prevent switch 178 from staying closed when the actuator is released.

Referring again to FIG. 9, when switch 176 is closed, AC power is provided to the controller 160, which includes a microcontroller 190 having an internal power supply for developing appropriate DC power. When the switch 178 is temporarily closed, an AC sensor unit 192 senses the closure and sends a signal to the microcontroller 190 indicating the same. The microcontroller 190 responds by sending a signal to the gate terminal of triac 194 to place the triac in a conducting mode so that power is provided through a normally closed auto/manual switch 196 (assuming the carrier 36 is locked in position for auto mode) to a carriage motor control relay 198. Delivery of power through relay 198 closes contacts 200 for providing power to the motor drive control circuit 162. Contacts 202 are also closed by relay 198. When triac 194 is set conducting power is also delivered to knife motor control relay 204, which in turn closes contacts 206 and 208. The microcontroller 190 sends a control signal to the gate terminal of triac 210 to place the triac in a conducting mode and begin energization of motor 54 and thus movement of the food product carriage. When the food product carriage moves away from the home position the sensor 164 indicates such via the input to microcontroller 190 and the microcontroller 190 ceases delivery of the on control signal to the gate terminal of triac 194 and instead sends an on control signal to the gate terminal of triac 212 for continued energization of relays 198 and 204. AC sensor unit 214 provides a signal to microcontroller 190 to indicate closure of the gauge plate interlock switch 216. The slicing operation continues per normal procedure with triac 212 on and with motor speed control being provided by the microcontroller signal applied to triac 210.

When a user desires to pause reciprocation of the food product carriage, the user simply pulls actuator 182 another time to again momentarily close switch 178. The AC sensor unit 192 again sends a signal to the microcontroller 190 indicating sensed closure of switch 178. The microcontroller 190 is programmed to interpret such a closure during a slicing operation as a pause indicator and responsively operates to pause the food product carriage at the home position. In particular, if, at the time of the pause signal and via its tracking operation from the inputs of encoder arrangement 130, the microcontroller 190 determines that the food product carriage is sufficiently far away from the home position, the microcontroller simply controls triac 210 to slow the food product carriage when it next approaches the home position and bring the food product carriage to rest at the home position. On the other hand, if, at the time of the pause signal, the food product carriage is considered too close to the home position, the microntroller 190 will control the triac 210 to continue movement of the food product carriage through the home position and through another reciprocation to then stop the food product carriage at the home position. Notably, with the above described controller arrangement the same switch 178 can be used for both starting an automatic slicing operation and pausing the automatic slicing operation once started, eliminating any need for a separate pause switch.

Figure 11:
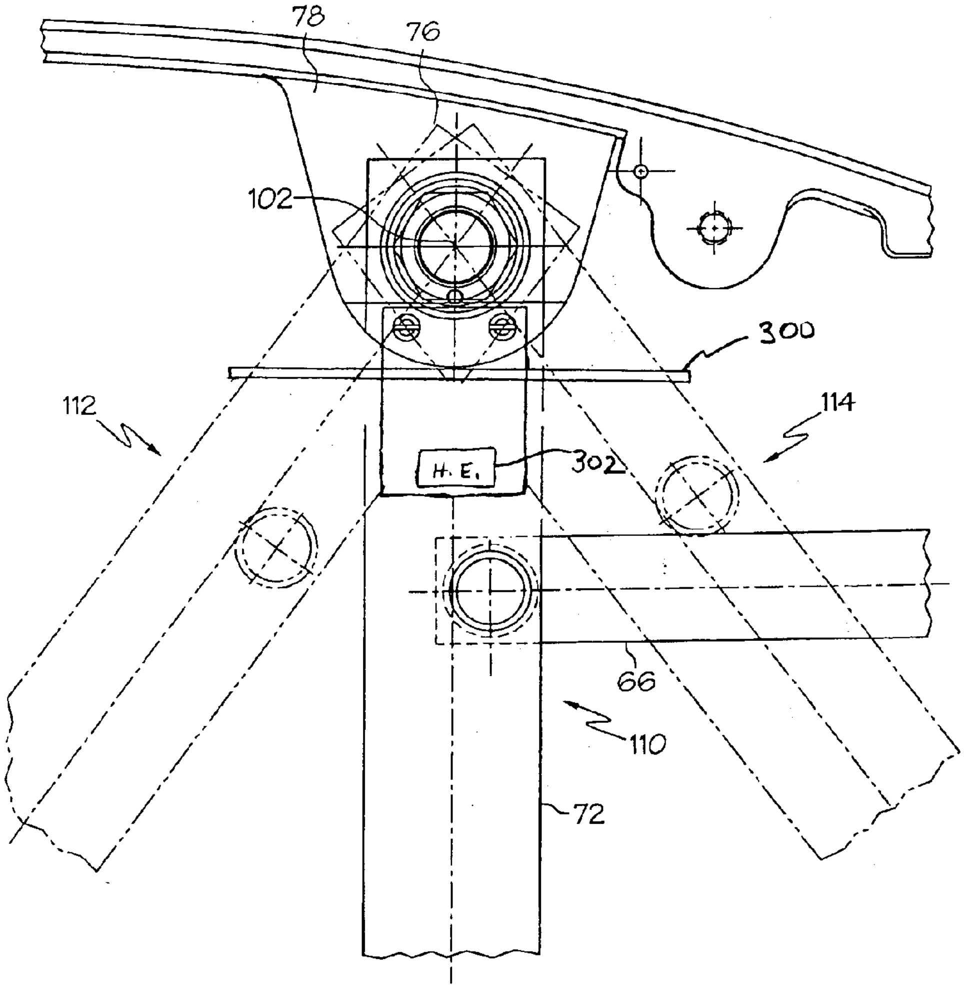
FIG. 11 illustrates another embodiment of an encoder system.

Although the foregoing description references details in accordance with the illustrated embodiment, it is recognized and anticipated that various changes and modifications could be made. For example, while the illustrated embodiment provides a light source and photo-detector arranged in a fixed position and a mask element arranged to move with the pivot link, as an alternative the mask element could instead be arranged in a fixed position and the light source and photo-detector could be arranged to move with the pivot link. Further, while the illustrated embodiment provides a mask element in which the windows or window regions are openings through the element and the light source and photo-detector are positioned on opposite sides of the mask element respectively, as an alternative the window regions of the mask element could instead be formed as reflective or non-reflective areas of the mask element and the light source and photo-detector could both be positioned on the same side of the mask element. Still further, while a curved mask element is shown in the illustrated embodiment, it is recognized that a non-curved mask element could be used in some cases. For example, a mask element formed with one or more bends therein might be used. A linear mask element might be used if the spacing between the light source on one side of the element and the photo-detector on an opposite side of the mask element is sufficient or, in the case of the reflective arrangement just noted above, the light source and photo-detector are capable of proper interaction with the window regions of the mask element. As another example, a system having a linear mask element could be provided where either the linear mask element or the opto-switch slides back and forth along the length of the pivot link in a reciprocal manner during pivot could be provided, or where the linear mask element or the opto-switch is configured to pivot its orientation relative to the pivot axis as the pivot axis pivots back and forth, or where the optical elements utilized are of a type which allows them to work effectively both when spaced close to the mask element and when spaced away from the mask element. Still further, while the use of an optical encoder arrangement is described and preferred, it is recognized that other encoder arrangements could be used such as Hall effect type encoder arrangements (such as the encoder arrangement show schematically in FIG. 11 using linear member 300 and Hall effect sensor unit 302).

What is claimed is:

1. A control system and a food product slicer including a rotatable slicing knife and a food product carriage mounted for movement back and forth past the slicing knife, the control system comprising:

a motor having a rotating output;

a multi-link drive arrangement connected between the rotating output of the motor and the food product carriage for moving the carriage during motor operation, a pivot link of the multi-link drive arrangement having a stationary axis, the pivot link pivoting back and forth about the stationary axis during motor operation;

an encoder arrangement associated with the pivot link and including a mask element, a light source and a photo-detector, the mask element including a plurality of window regions distributed thereon, the light source positioned for directing light at the window regions of the mask element sequentially during pivoting movement of the pivot link and the photo-detector positioned to receive light directed at the window regions by the light source, the photo-detector providing output signals responsive to receipt/non-receipt of light emitted by the light source; and a controller receiving the photo-detector output signals and responsively tracking movement of the food product carriage.

2. The control system and food product slicer of claim 1 wherein a position of the light source is fixed and a position of the photo-detector is fixed, and the mask element is operatively coupled for movement with the pivot link.

3. The control system and food product slicer of claim 1 wherein the multi-link drive arrangement comprises a four link arrangement.

4. The control system and food product slicer of claim 1 wherein the window regions allow light to pass through the mask element and the light source is positioned on one side of the mask element and the photo-detector is positioned on an opposite side of the mask element.

5. The control system and food product slicer of claim 1 wherein the window regions reflect light and both the light source and the photo-detector are positioned on a similar side of the mask element.

6. The control system and food product slicer of claim 1 wherein the light source and the photo-detector are connected to a PC board.

7. The control system and food product slicer of claim 1 wherein the mask element is formed as a curved mask element.

8. The control system and food product slicer of claim 1 wherein the mask element is formed with one or more bends therein.

9. The control system and food product slicer of claim 1 wherein the controller receives an input from a combination start/pause switch and is operable to begin a slicing operation when the combination start/pause switch is triggered prior to slicing, and the controller is operable to pause a slicing operation when the combination start/pause switch is triggered during slicing.

10. The control system and food product slicer of claim 1 wherein a slicing operation is defined by repeated slicing strokes and return strokes of the food product carriage, each slicing stroke defined by movement of the food product carriage from a first position to a second position and each return stroke defined by movement of the food product carriage from the second position back to the first position, the controller operatively connected for controlling a speed of motor rotation and thus a speed of food product carriage movement, and during the slicing operation the controller operates to effect motor rotation so as to move the food product carriage at a first average speed for slicing strokes and at a second average speed for return strokes, wherein the first average speed is less than the second average speed.

11. The control system and food product slicer of claim 10 wherein the controller operates to effect motor rotation so as to slow movement of the food product carriage as the food product carriage approaches the second position during each slicing stroke.

12. The control system and food product slicer of claim 1 wherein the pivot link pivots back and forth between a first position and a second position, the photo-detector, light source and mask element are arranged to provide alignment between the light source, one of the plurality of window regions and the photo-detector when the pivot link is at the first position, the controller operable to detect a change in direction of movement of the food product carriage based upon an output signal of the photo-detector when the pivot link is in the first position.

13. The control system of claim 12, wherein the output signal of the photo-detector when the pivot link is in the first position includes at least one signal characteristic which identifies the first position.

14. The control system and food product slicer of claim 1 wherein the controller counts at least pulse signals output by the photo-detector in order to track movement of the food product carriage.

15. The control system and food product slicer of claim 14 wherein the controller counts both pulse signals and regions between the pulse signals in order to track movement of the food product carriage.

16. The control system and food product slicer of claim 14, further comprising a carriage sensor for detecting positioning of the food product carriage at at least one of a slicing stroke starting position of the food product carriage and a slicing stroke completed position of the food product carriage, an output of the carriage sensor provided to the controller and the controller responsively resetting its tracking operation when the food product carriage is sensed by the carriage sensor.

17. A control system and a food product slicer including a rotatable slicing knife and a food product carriage mounted for movement back and forth past the slicing knife, the control system comprising:

a motor having a rotating output;

a multi-link drive arrangement connected between the rotating output of the motor and the food product carriage for moving the carriage during motor operation, a pivot link of the multi-link drive arrangement having a stationary axis, the pivot link pivoting back and forth about the stationary axis during motor operation;

an encoder arrangement including an arcuate mask element, a light source and a photo-detector, an axis of the arcuate mask element being substantially coincident with the stationary axis, the arcuate mask element including a plurality of openings thereon, the light source positioned to one side of the arcuate mask element and the photo-detector positioned to an opposite side of the arcuate mask element, the mask element operatively coupled for pivoting movement with the pivot link, the photo-detector outputting signals responsive to receipt/non-receipt of light emitted by the light source and passing through the openings in the arcuate mask element.

18. The control system and food product slicer of claim 17 wherein the multi-link drive arrangement comprises a four link arrangement.

19. The control system and food product slicer of claim 17 wherein the light source and the photo-detector are connected to a PC board.

20. The control system and food product slicer of claim 17, further comprising:

a controller receiving the photo-detector signals and responsively tracking movement of the food product carriage.

21. The control system and food product slicer of claim 20 wherein a slicing operation is defined by repeated slicing strokes and return strokes of the food product carriage, each slicing stroke defined by movement of the food product carriage from a first position to a second position and each return stroke defined by movement of the food product carriage from the second position back to the first position, the controller operatively connected for controlling a speed of motor rotation and thus a speed of food product carriage movement, and during the slicing operation the controller operates to effect motor rotation so as to move the food product carriage at a first average speed for slicing strokes and at a second average speed for return strokes, where the first average speed is less than the second average speed.

22. The control system and food product slicer of claim 20 wherein the controller counts at least pulse signals output by the photo-detector in order to track movement of the food product carriage.

23. The control system and food product slicer of claim 22 wherein the controller counts both pulse signals and regions between the pulse signals in order to track movement of the food product carriage.

24. The control system and food product slicer of claim 23, further comprising a carriage sensor positioned for detecting one of a slicing stroke starting position of the carriage and a slicing stroke completed position of the carriage, an output of the carriage sensor provided to the controller and the controller responsively resetting its tracking operation when the food product carriage is sensed by the carriage sensor.

25. A control system and a food product slicer including a rotatable slicing knife and a food product carriage mounted for movement back and forth past the slicing knife, the control system comprising:

a motor having a rotating output;

a drive arrangement connecting the rotating output to the food product carriage for movement thereof;

an encoder arrangement including a first part that moves with part of the drive arrangement and a second part that remains stationary during movement of the part of the drive arrangement, one of the first part and the second part providing a signal output responsive to movement of the part of the drive arrangement, wherein the second part is a linear member and the encoder arrangement utilizes Hall effect technology; and a controller receiving the signal output and responsively tracking movement of the food product carriage.

26. A control system and a food product slicer including a rotatable slicing knife and a food product carriage mounted for movement back and forth past the slicing knife, the control system comprising:

a motor having a rotating output;

a multi-link drive arrangement connected between the rotating output of the motor and the food product carriage for moving the carriage during motor operation, a pivot link of the multi-link drive arrangement having a stationary axis, the pivot link pivoting back and forth about the stationary axis during motor operation;

an encoder arrangement associated with the pivot link and including a first part that moves back and forth with the pivot link and a second part that remains stationary during movement of the pivot link, one of the first part and the second part producing a signal output responsive to movement of the pivot link; and a controller receiving the signal output and responsively tracking movement of the food product carriage.

27. The control system and food product slicer of claim 26 wherein the second part provides the output signals.

28. The control system and food product slicer of claim 26 wherein the second part includes a light source.

29. The control system and food product slicer of claim 28 wherein the first part includes a windowed mask element.

* * * * *